(12) United States Patent
Nishimoto et al.

(10) Patent No.: US 12,224,168 B2
(45) Date of Patent: Feb. 11, 2025

(54) MASS SPECTROMETER AND MASS SPECTROMETRY METHOD

(71) Applicant: Hitachi High-Tech Corporation, Tokyo (JP)

(72) Inventors: Takuma Nishimoto, Tokyo (JP); Zihao Ong, Tokyo (JP); Isao Furuya, Tokyo (JP); Hiroshi Touda, Tokyo (JP); Yuichiro Hashimoto, Tokyo (JP); Masuyuki Sugiyama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 428 days.

(21) Appl. No.: 17/795,355

(22) PCT Filed: Dec. 2, 2020

(86) PCT No.: PCT/JP2020/044929
§ 371 (c)(1),
(2) Date: Jul. 26, 2022

(87) PCT Pub. No.: WO2021/157175
PCT Pub. Date: Aug. 12, 2021

(65) Prior Publication Data
US 2023/0056978 A1    Feb. 23, 2023

(30) Foreign Application Priority Data

Feb. 3, 2020   (JP) .................................. 2020-016216

(51) Int. Cl.
*H01J 49/00*   (2006.01)
(52) U.S. Cl.
CPC ............................... *H01J 49/0009* (2013.01)

(58) Field of Classification Search
CPC .................................................. H01J 49/0009
See application file for complete search history.

(56) References Cited

U.S. PATENT DOCUMENTS 5,945,678 A     8/1999  Yanagisawa
10,262,852 B2 *  4/2019  Sekimoto .............. H01J 49/145
(Continued)

FOREIGN PATENT DOCUMENTS

JP    H07-325020 A    12/1995
JP    2001-236921 A    8/2001
(Continued)

OTHER PUBLICATIONS

European Search Report issued on Jan. 31, 2024 for European Patent Application No. 20917847.4.

*Primary Examiner* — Nicole M Ippolito
(74) *Attorney, Agent, or Firm* — Volpe Koenig

(57) ABSTRACT

In a mass spectrometer, due to impurities accumulated inside a frame, a withstand voltage may decrease, and electric discharge may occur in an ion source, thereby making it impossible to perform normal measurement. Since a result of abnormality measurement due to the electric discharge cannot be distinguished from measurement abnormality caused by clogging of a tube between a pretreatment unit and a needle, there is a problem in that time is required to identify abnormal portions, and a maintenance property is lowered. As a unit for solving the problem, a return current detection unit connected in series between the frame and an ion source power supply that applies a voltage to the needle and a return current detection unit connected in series between the frame and a counter electrode power supply that applies a voltage to a counter electrode are provided.

13 Claims, 12 Drawing Sheets

(56) References Cited

U.S. PATENT DOCUMENTS

| | | | |
|---|---|---|---|
| 2001/0017351 A1 | 8/2001 | Terakura | |
| 2003/0155497 A1 | 8/2003 | Kato | |
| 2008/0151465 A1* | 6/2008 | Fujita | ............... H01T 23/00 |
| | | | 361/220 |
| 2012/0037799 A1* | 2/2012 | Sakairi | ............... G01N 27/62 |
| | | | 250/288 |
| 2012/0262182 A1* | 10/2012 | Matsuoka | ......... G01N 15/0656 |
| | | | 324/464 |
| 2019/0006165 A1 | 1/2019 | Corr et al. | |

FOREIGN PATENT DOCUMENTS

| | | |
|---|---|---|
| JP | 2001-236922 A | 8/2001 |
| JP | 2008-157671 A | 7/2008 |
| JP | 2012-043672 A | 3/2012 |
| WO | 03065406 A1 | 8/2003 |

* cited by examiner

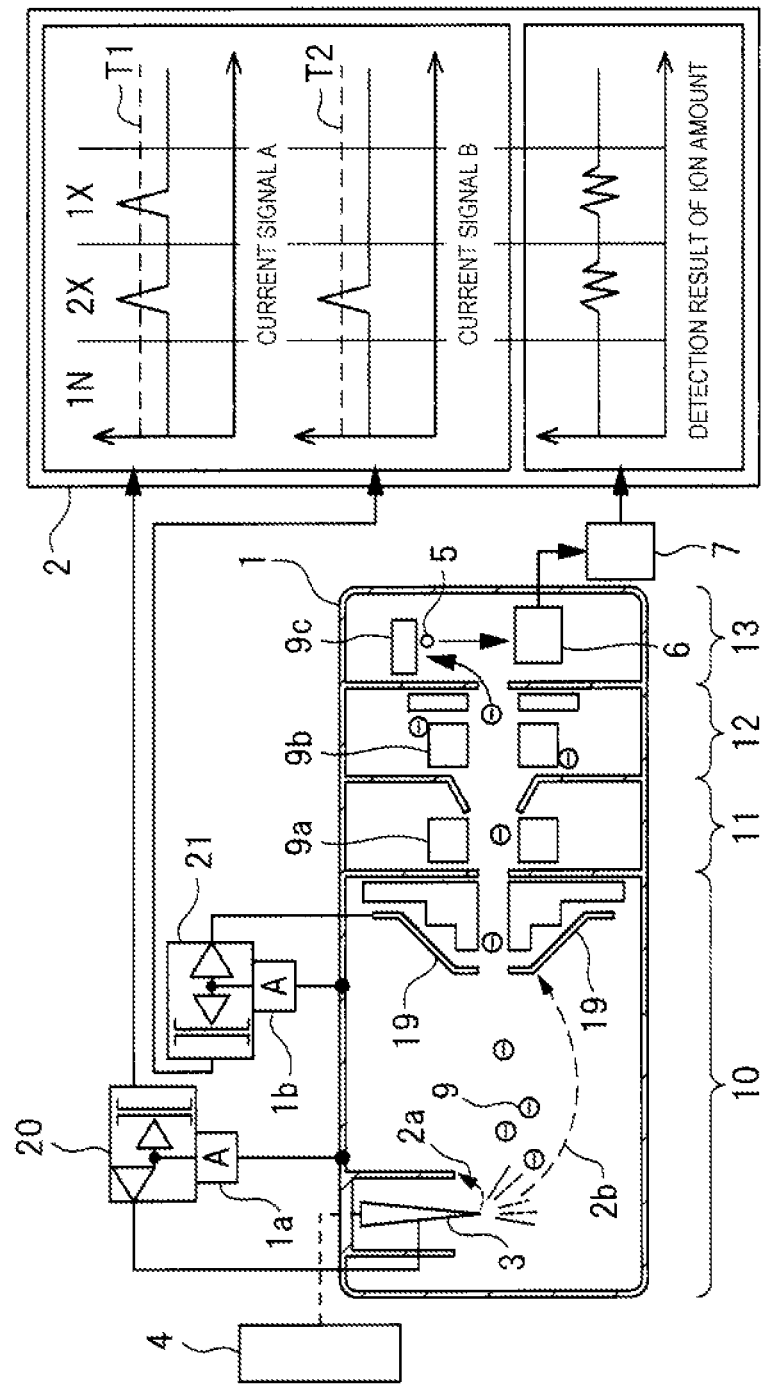
[FIG. 1]

[FIG. 2]
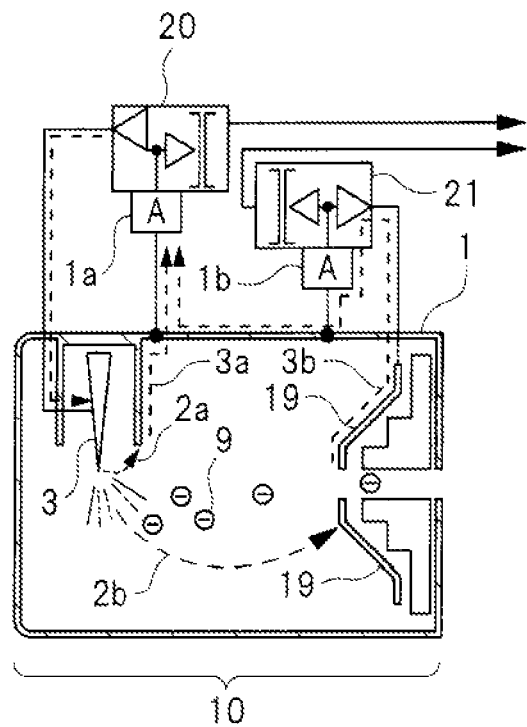
[FIG. 3]
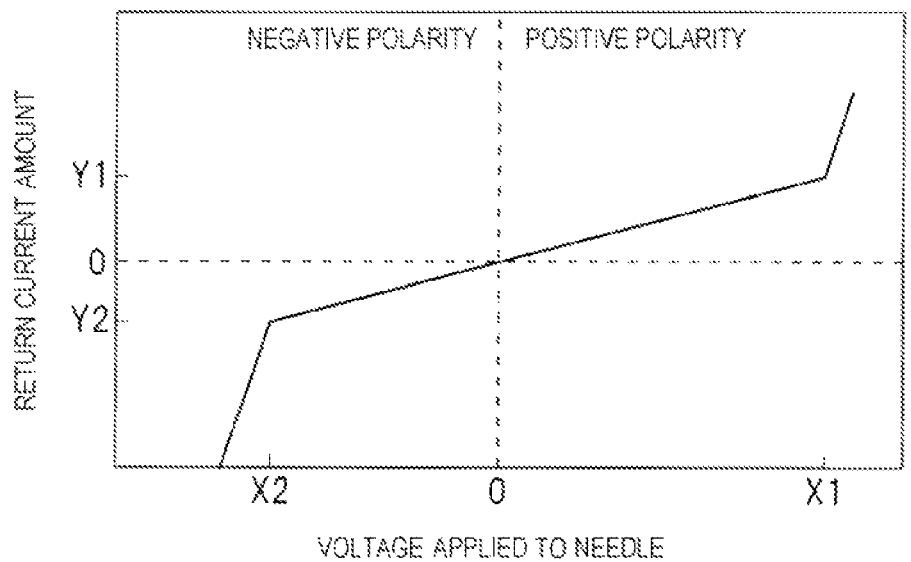

[FIG. 4]
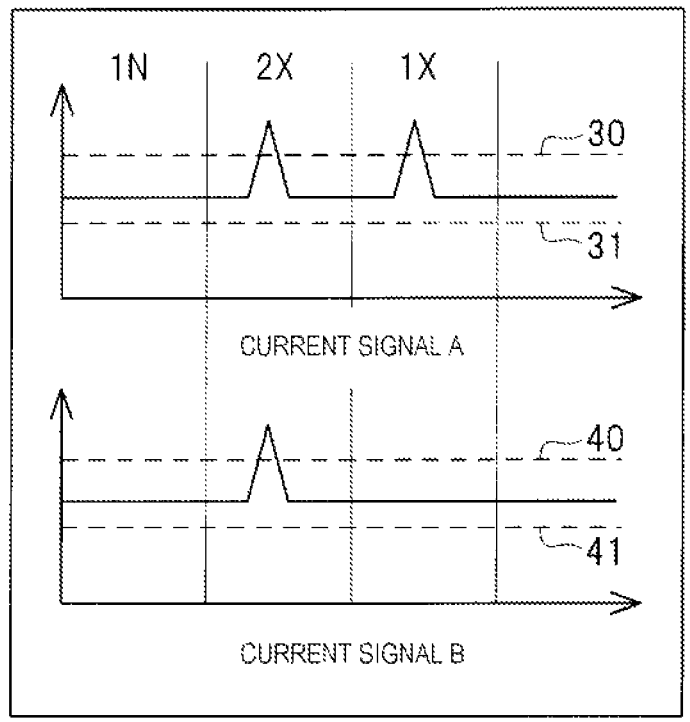
[FIG. 5]
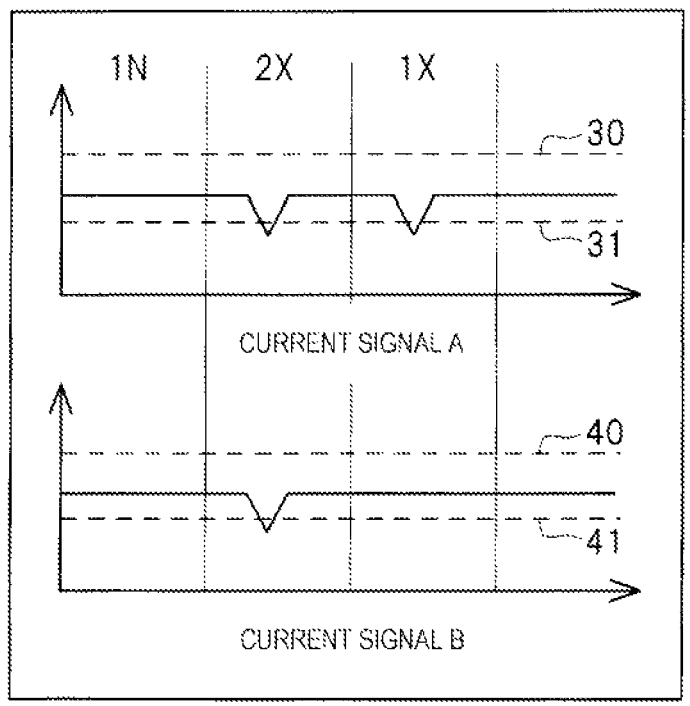

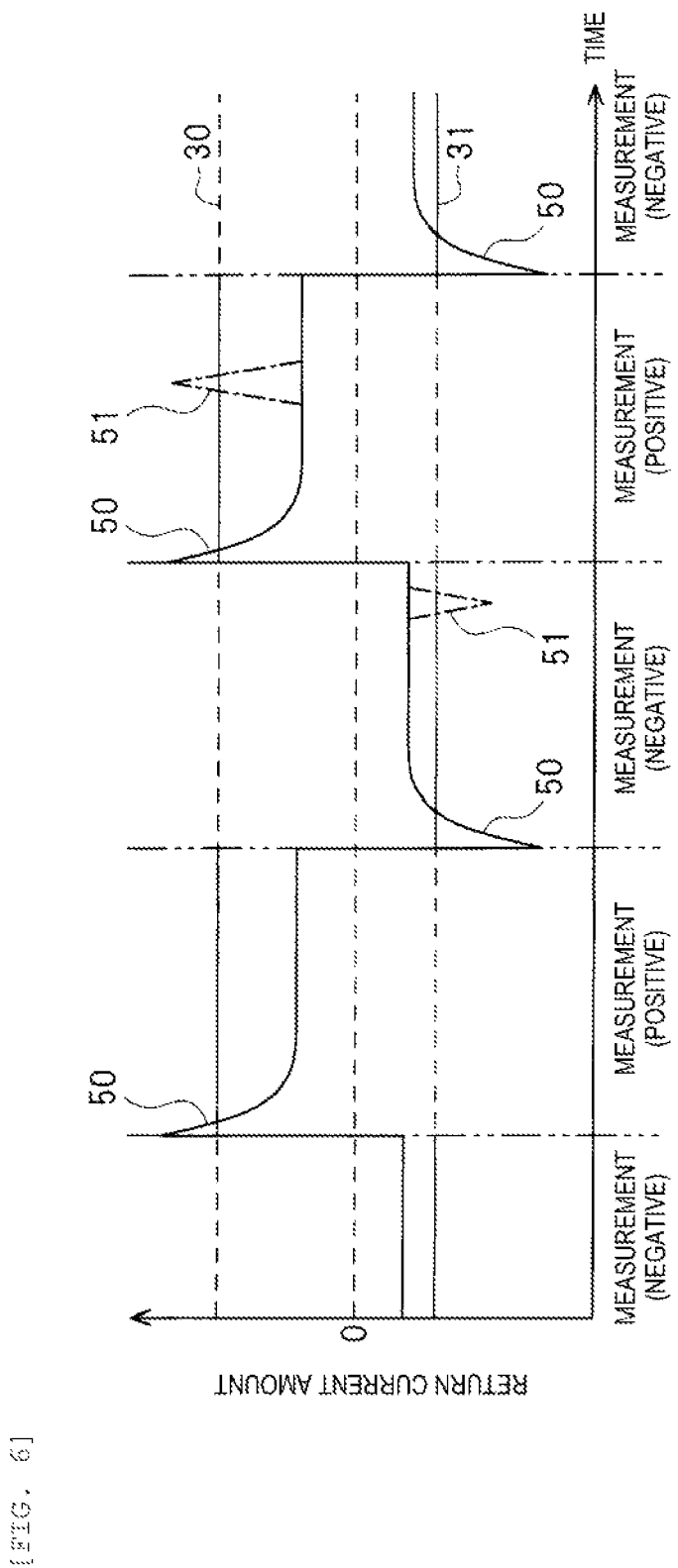

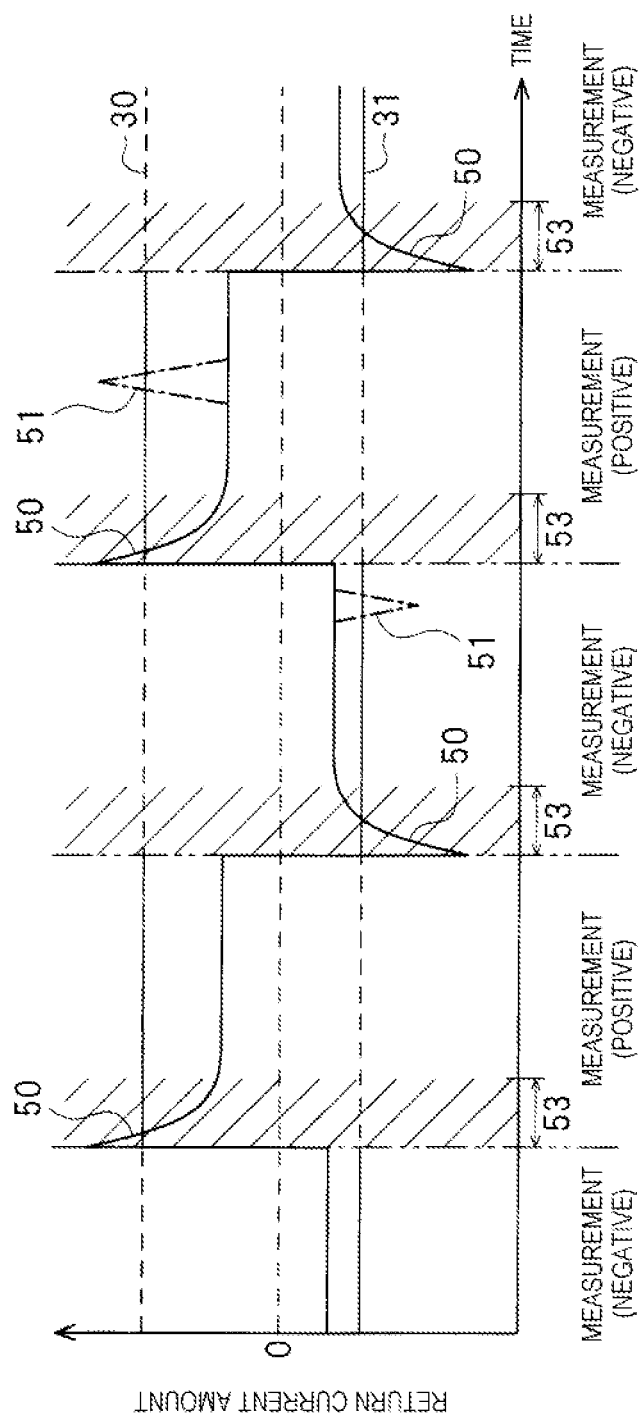

[FIG. 8]
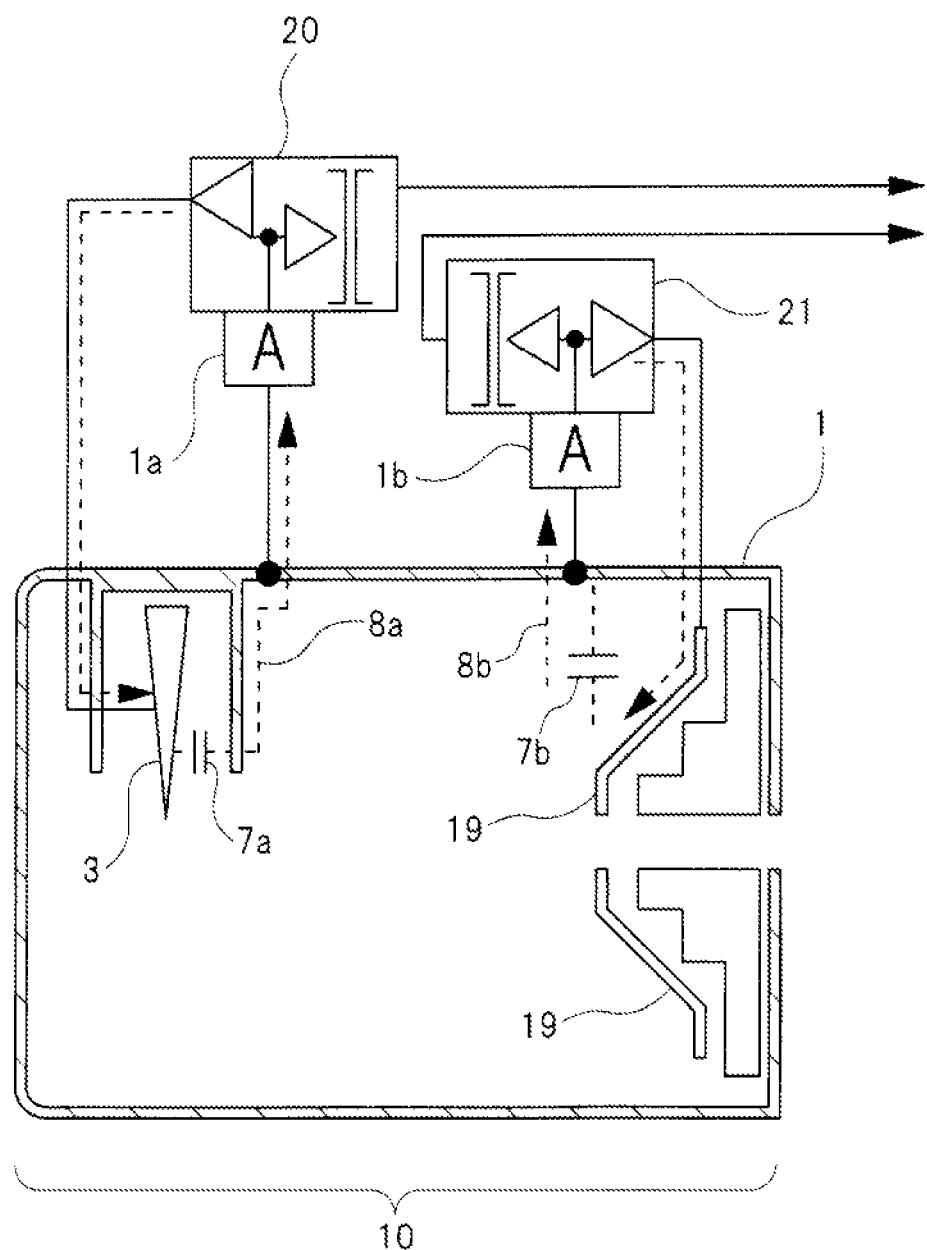

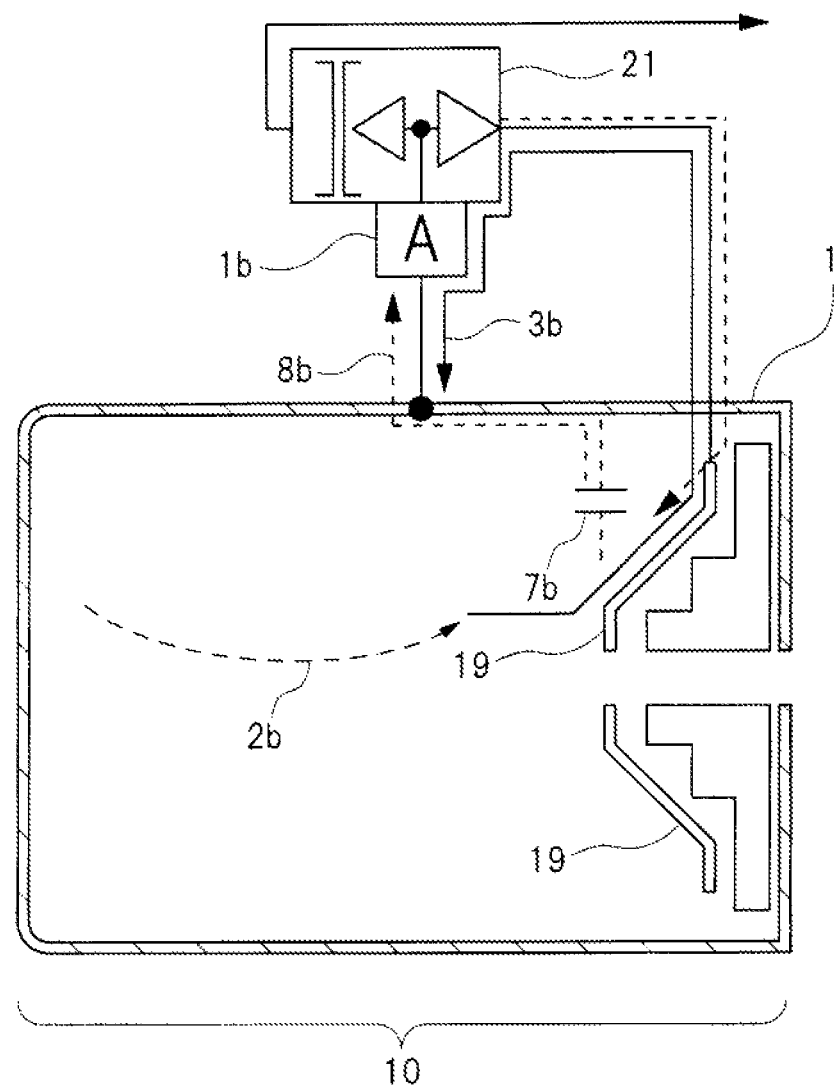
[FIG. 9]

[FIG. 10]
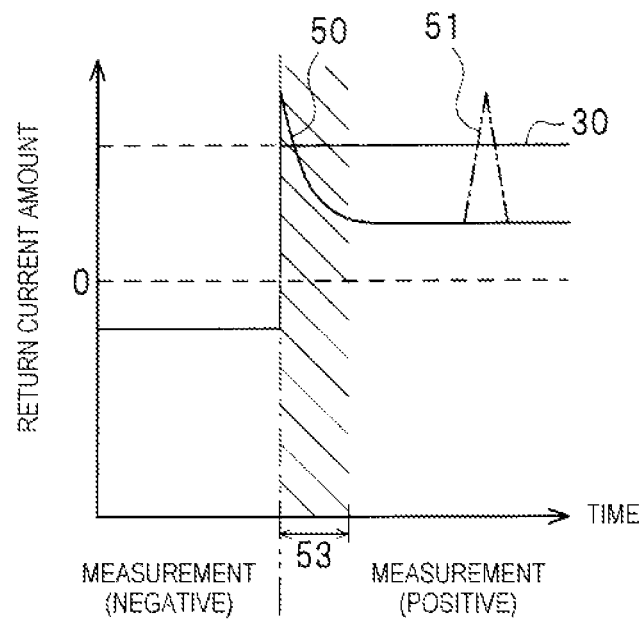
[FIG. 11]
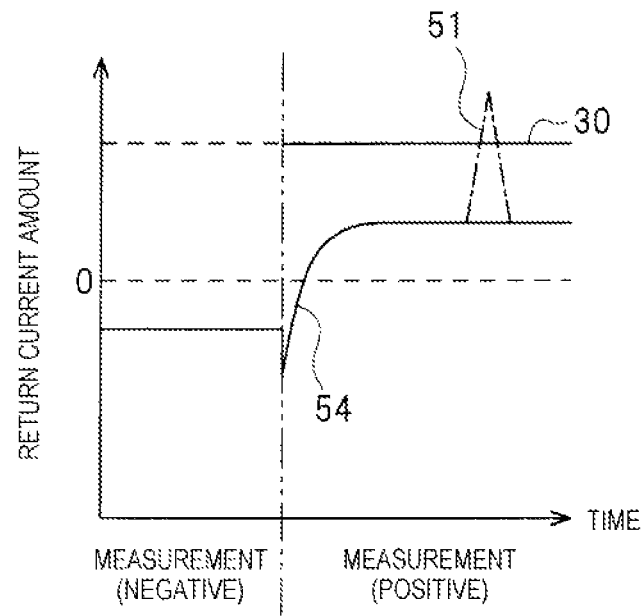

[FIG. 12]
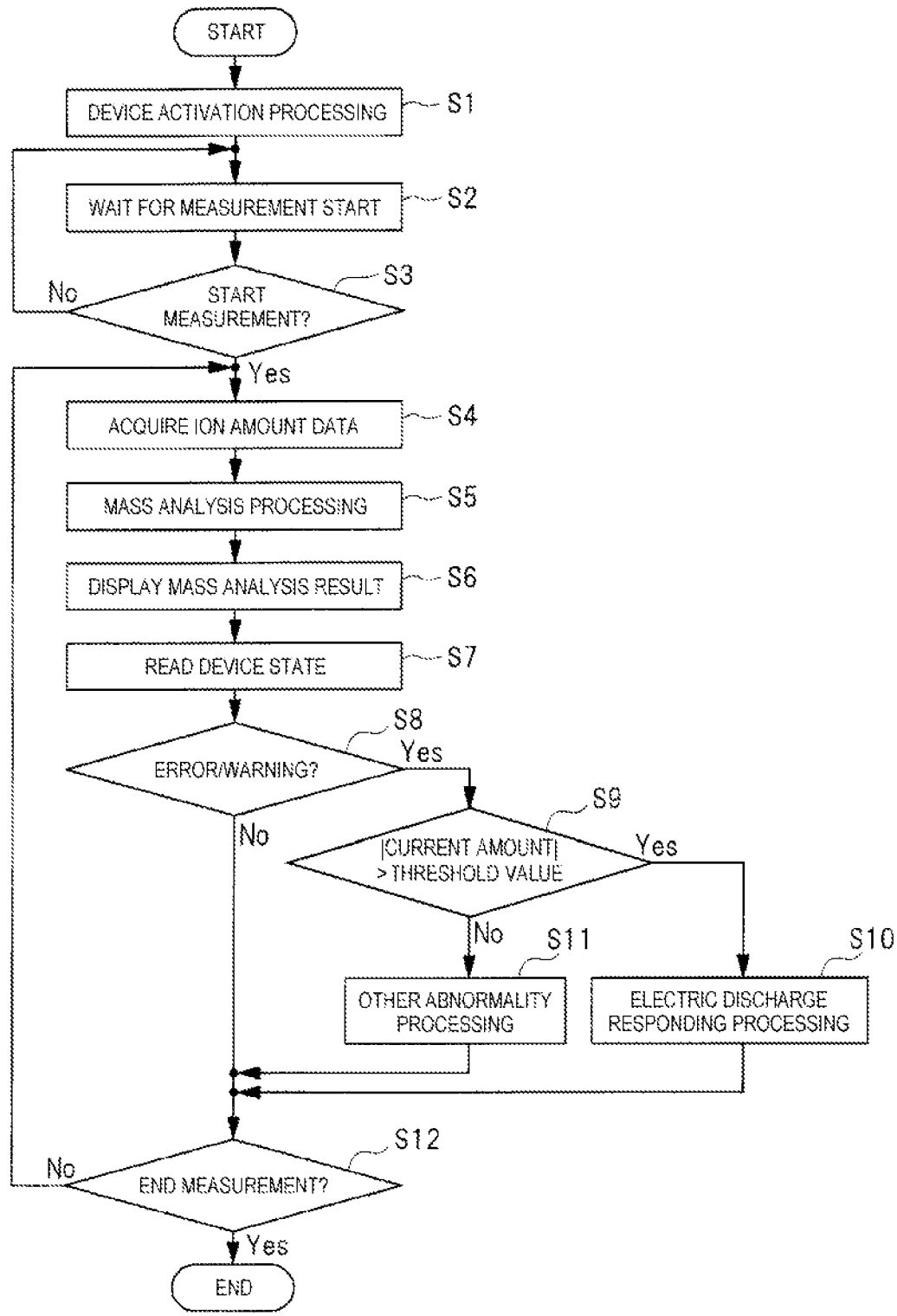

[FIG. 13]
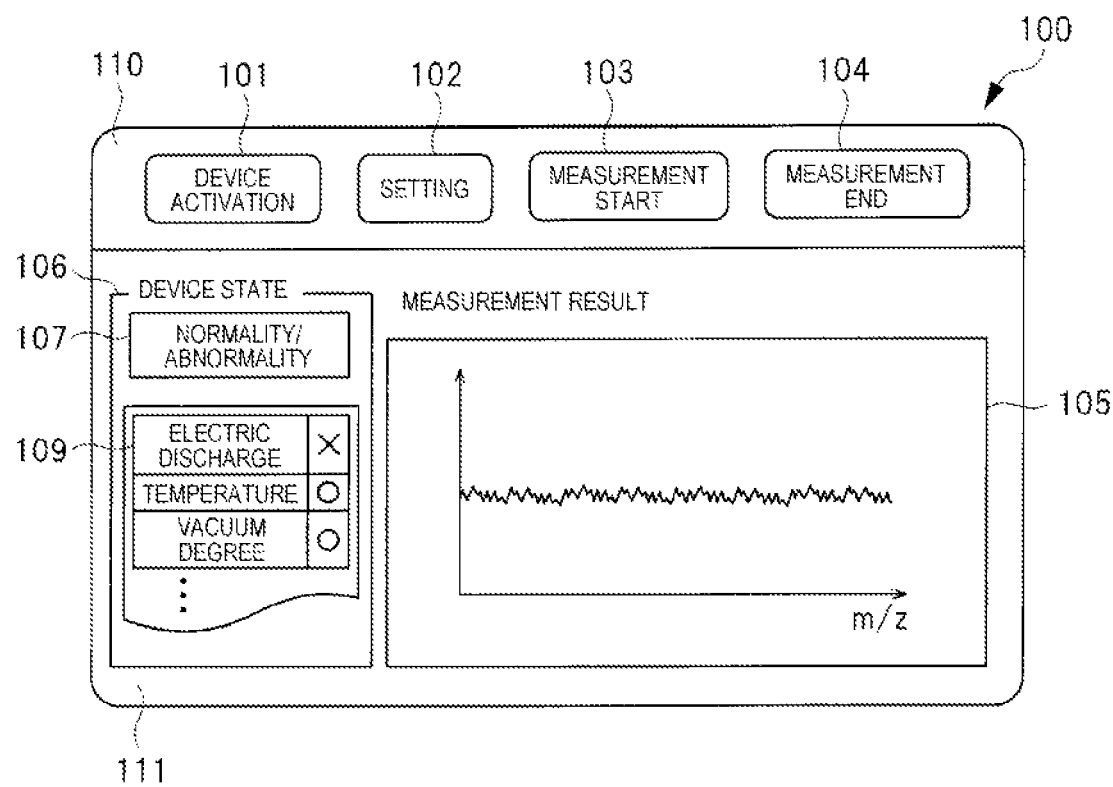

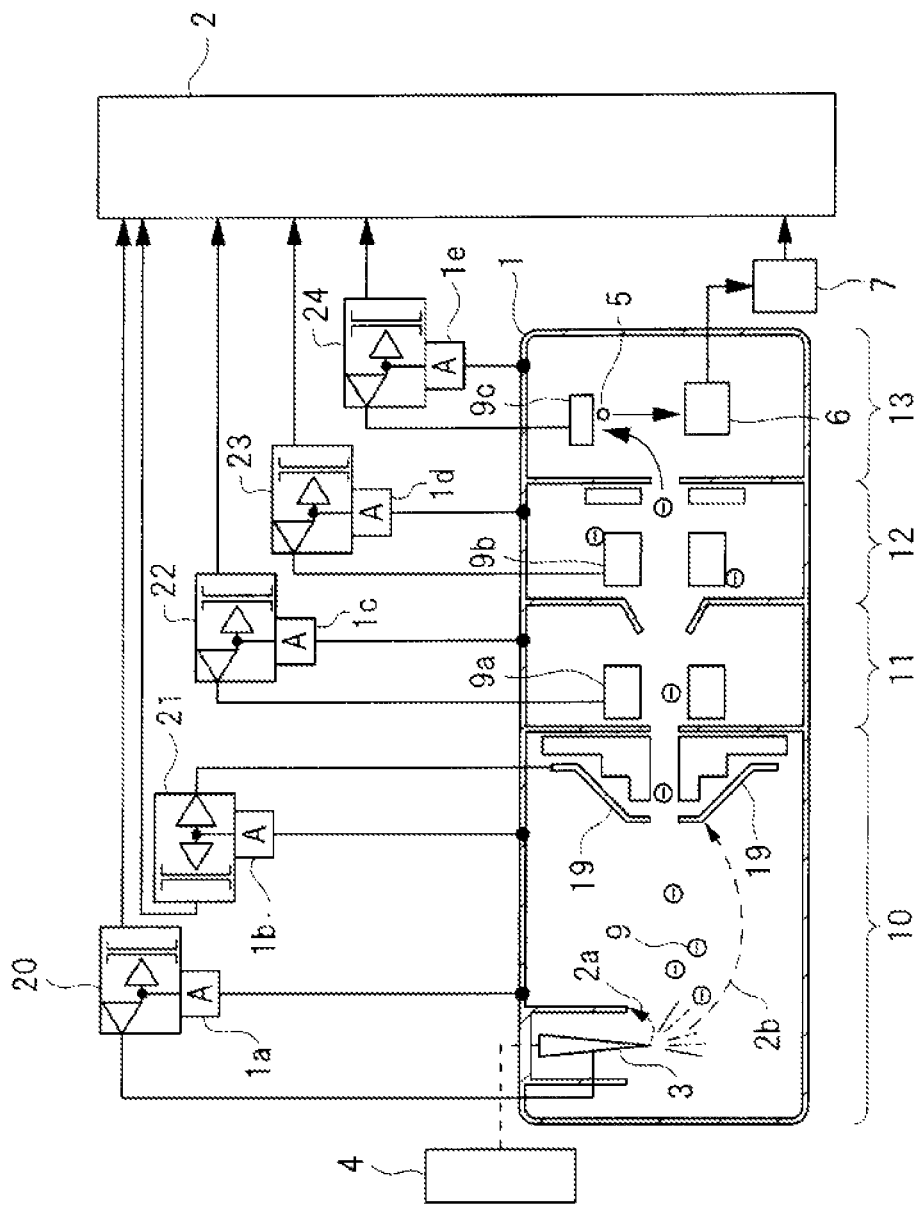
[FIG. 14]

[FIG. 15]
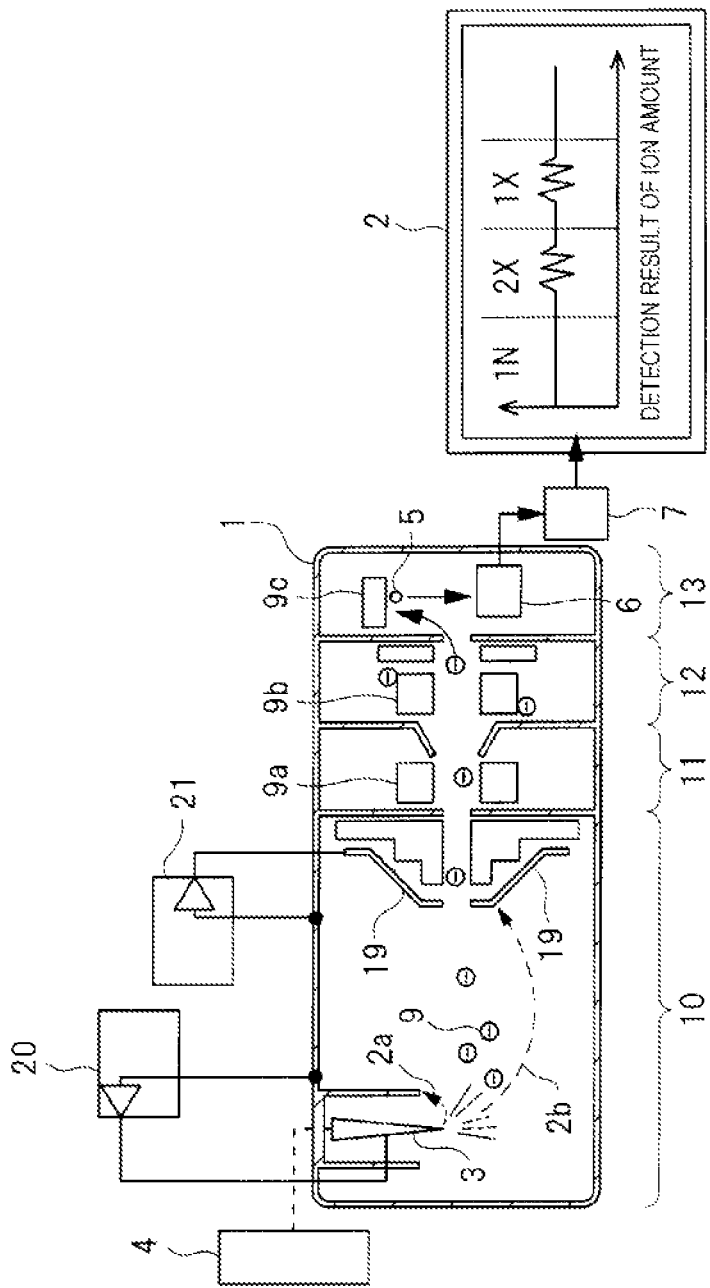

MASS SPECTROMETER AND MASS SPECTROMETRY METHOD

TECHNICAL FIELD

The present invention relates to a mass spectrometer and a mass spectrometry method, and more particularly to a mass spectrometer including a needle, a counter electrode facing the needle, an ion source power supply that applies a voltage to the needle, and a counter electrode power supply that applies a voltage to the counter electrode, and a mass spectrometry method using the mass spectrometer.

BACKGROUND ART

As a part constituting the mass spectrometer, for example, an ion source that vaporizes a sample to be analyzed injected from a pretreatment unit and that ionizes the vaporized sample by applying a high electric field to the vaporized sample is known.

PTL 1 (WO 03/065406) discloses that, in a mass spectrometer, when a sample to be analyzed is injected into an ion source from a chromatograph which is a pretreatment unit, a current value of ions having a specific mass is measured, it is determined that nozzle clogging occurs when the current value falls below a threshold value, and an operator is notified of the occurrence of measurement abnormality in the device.

CITATION LIST

Patent Literature

PTL 1: WO 03/065406

SUMMARY OF INVENTION

Technical Problem

A cause of measurement abnormality occurring at a high frequency during measurement of a mass spectrometer is not only clogging (noise clogging) in a tube leading from a pretreatment unit to the needle, but also electric discharge in an ion source. In general, an upper limit is set for a voltage that can be applied to an ion source, and electric discharge does not occur in a normal mass spectrometer as long as the normal mass spectrometer is used at the voltage or lower. However, when a sample to be analyzed is ionized by the ion source, a unionized sample is accumulated as impurities inside the ion source, and thus a withstand voltage inside the ion source may decrease and the electric discharge may occur. Accordingly, normal measurement cannot be performed. At this time, since a result of abnormality measurement due to the electric discharge cannot be distinguished from abnormality such as clogging of a tube of a pretreatment unit, there is a problem in that time is required to identify abnormal portions and remove the cause of the abnormality, which leads to a decrease in a maintenance property of the mass spectrometer and waste of the sample.

Other problems and novel features will become apparent based on a description of the present specification and accompanying drawings.

Solution to Problem

An outline of a representative one of embodiments disclosed in the present application will be briefly described as follows.

A mass spectrometer according to one embodiment is provided with return current detection units connected in series between an ion source power supply and a frame and between a counter electrode power supply and the frame, and compares currents measured by these return current detection units with a threshold value to detect occurrence of electric discharge and a portion where the electric discharge occurs.

Advantageous Effects of Invention

According to the representative embodiment, performance of the mass spectrometer can be improved. In particular, it is possible to facilitate identification of the portion where the electric discharge occurs at the time of occurrence of abnormal electric discharge during the measurement, to reduce waste of the sample, to select and acquire effective measurement data, and to improve a maintenance property of the mass spectrometer.

BRIEF DESCRIPTION OF THE DRAWINGS

FIG. 1 is a schematic diagram of a mass spectrometer according to a first embodiment.

FIG. 2 is a connection diagram of an electric circuit that detects an electric discharge current of an ion source constituting the mass spectrometer according to the first embodiment.

FIG. 3 is a graph showing properties of an electric discharge voltage and a current of a mass spectrometer according to a second embodiment.

FIG. 4 is a signal diagram showing setting of a threshold value for determining abnormal electric discharge in the mass spectrometer according to the second embodiment.

FIG. 5 is a signal diagram showing setting of the threshold value for determining the abnormal electric discharge in the mass spectrometer according to the second embodiment.

FIG. 6 is a signal diagram showing a return current waveform of an ion source power supply at the time of positive and negative ion switching measurement.

FIG. 7 is a signal diagram showing a method for masking an inrush current at the time of positive and negative switching measurement in a mass spectrometer according to a third embodiment.

FIG. 8 is a connection diagram showing a path of an inrush current of each of the ion source power supply and a counter electrode power supply that constitute a mass spectrometer according to a fourth embodiment.

FIG. 9 is a connection diagram showing a path of each of an electric discharge current and the inrush current of the counter electrode power supply constituting the mass spectrometer according to the fourth embodiment.

FIG. 10 is a signal diagram showing a return current waveform of the ion source power supply of the mass spectrometer according to the fourth embodiment.

FIG. 11 is a signal diagram showing a return current waveform of the counter electrode power supply of the mass spectrometer according to the fourth embodiment.

FIG. 12 is an operation flow of the mass spectrometer according to the first embodiment.

FIG. 13 is a schematic diagram showing a user interface screen of the mass spectrometer according to the first embodiment.

FIG. 14 is a schematic diagram of a mass spectrometer according to a fifth embodiment.

FIG. 15 is a schematic diagram showing a mass spectrometer according to a comparative example.

DESCRIPTION OF EMBODIMENTS

Hereinafter, embodiments of the invention will be described in detail with reference to the drawings. In all the drawings illustrating the embodiment, members having the same functions are denoted by the same reference numerals, and repeated descriptions thereof will be omitted. In addition, in the embodiments, description of the same or similar parts will not be repeated in principle unless particularly necessary.

First Embodiment

Hereinafter, a description will be made for a mass spectrometer mounted with an ion source power supply and a counter electrode power supply each including a return current detection unit, and a method for detecting a measurement abnormality, presence or absence of electric discharge, and a portion where the electric discharge occurs based on a current amount detected by the return current detection unit and a detection result of an ion amount measured by the mass spectrometer when a sample to be analyzed is measured <Structure of Present Embodiment>

FIG. 1 is a schematic diagram of the mass spectrometer according to the present embodiment. FIG. 1 is a diagram showing a unit that detects an electric discharge current of an ion source in the mass spectrometer. The mass spectrometer includes a frame (device frame) 1 which is a container having conductivity and functioning as a ground (frame ground). In addition, the mass spectrometer includes an ion source 10, a focusing unit 11, a separating unit 12, a detector 13, an ion detector 7, and a control unit 2.

The ion source 10, the focusing unit 11, the separating unit 12, and the detector 13 are provided in the frame 1. The ion source 10 is a part that ionizes the sample to be analyzed injected from a pretreatment unit 4. An ionized sample 9 generated by the ion source 10 is focused by the focusing unit 11. That is, the focusing unit 11 is a part that focuses the ionized sample by applying a voltage to an electrode 9a provided in the focusing unit 11. The separating unit 12 is a part that filters the ionized sample 9 focused by the focusing unit 11 according to a mass-to-charge ratio, thereby allowing only the ionized sample 9 to be detected to pass therethrough. The filtering is performed by applying a voltage to an electrode 9b provided in the separating unit 12. The detector 13 is a device that outputs an electrical signal corresponding to an amount of the ionized sample 9 passed through the separating unit 12. The ion detector 7 is a device that acquires an ion amount based on the electrical signal output from the detector 13. The control unit 2 is a device that displays a detection result of the ion amount on a display (display unit). The pretreatment unit 4 is, for example, a device that feeds a sample (inspection target) such as human blood or urine to the mass spectrometer.

The detector 13 includes a conversion dynode (electrode) 9c that causes the ionized sample 9 passed through the separating unit 12 to collide with the detector 13 and causes the ionized sample 9 to emit electrons 5, and an ion electric conversion unit 6 that outputs an electrical signal corresponding to a quantity of the electrons 5 to the ion detector 7 when the electrons 5 are incident.

The ion source 10 includes a needle 3 that ionizes the sample to be analyzed injected from the pretreatment unit 4, an ion source power supply 20 that applies a voltage for ionizing the sample to the needle 3, a counter electrode 19 that generate an electric field for drawing the ionized sample into the focusing unit 11, and a counter electrode power supply 21 that applies a voltage to the counter electrode 19. The needle 3 and the counter electrode 19 are apart from each other in the frame 1. The pretreatment unit 4 and the needle 3 are connected to each other via a tube. The counter electrode 19 is an electrode facing the needle 3. In terms of the counter electrode 19, "counter" is described here. However, it is not required that a surface of the needle 3 and a surface of the counter electrode 19 face each other in a state of being parallel to each other, and it is also not required that the counter electrode 19 includes a plurality of electrodes and surfaces of these electrodes face each other in a state of being parallel to each other.

Each of the ion source power supply 20 and the counter electrode power supply 21 includes a first terminal, a second terminal, and a third terminal. The first terminal (output terminal) of the ion source power supply 20 is electrically connected to the needle 3. The second terminal (ground) of the ion source power supply 20 is electrically connected to the frame 1. The third terminal of the ion source power supply 20 is electrically connected to the control unit 2. The first terminal (output terminal) of the counter electrode power supply 21 is electrically connected to the counter electrode 19. The second terminal (ground) of the counter electrode power supply 21 is electrically connected to the frame 1. The third terminal of the counter electrode power supply 21 is electrically connected to the control unit 2. However, in the ion source power supply 20, the third terminal is electrically insulated from the first terminal and the second terminal. Similarly, in the counter electrode power supply 21, the third terminal is electrically insulated from the first terminal and the second terminal.

The ion source power supply 20 includes a return current detection unit (ammeter) 1a capable of detecting an output current from a return current returned via the frame 1. The counter electrode power supply 21 includes a return current detection unit (ammeter) 1b capable of detecting the output current from the return current returned via the frame 1.

The return current detection unit 1a is connected in series between the ion source power supply 20 and the frame 1. That is, the second terminal of the ion source power supply 20 and the return current detection unit 1a are electrically connected, and the return current detection unit 1a and the frame 1 are electrically connected. In other words, the ion source power supply 20 and the frame 1 are electrically connected via the return current detection unit 1a. Similarly, the return current detection unit 1b is connected in series between the counter electrode power supply 21 and the frame 1. That is, the second terminal of the counter electrode power supply 21 and the return current detection unit 1b are electrically connected, and the return current detection unit 1b and the frame 1 are electrically connected. In other words, the counter electrode power supply 21 and the frame 1 are electrically connected via the return current detection unit 1b.

The return current detection units 1a and 1b each include a unit that detects a passed current amount and that transmits the detected current amount to the control unit 2. For example, current amount detection accuracy of the return current detection units is about several nA to several tens of nA, and a range of a detectable current amount is about several tens of μA.

The units that transmit the current amounts detected by the return current detection units 1a and 1b are electrically insulated from the control unit 2 which is a transmission target. In other words, the return current detection units 1a and 1b, the ion source power supply 20, and the counter electrode power supply 21 are insulated from the control unit 2. In addition, a part of a path that transmits the above current amount from each of the return current detection units 1a and 1b to the control unit 2 is insulated. This is because, it is difficult for the return current detection units 1a and 1b to accurately detect the current when the return current detection units 1a and 1b, the ion source power supply 20, and the counter electrode power supply 21 conduct with the control unit 2. By performing the insulation as described above, current detection accuracy of the return current detection units 1a and 1b can be improved. As a unit that transmits the current amounts from the ion source power supply 20 and the counter electrode power supply 21 to the control unit 2 in an electrically insulation state, for example, optical communication using a photodiode used in in-vehicle communication can be used.

The control unit 2 has a function of displaying a detection result of the ion amount transmitted from the ion detector 7 to an operator (device operator). In addition, the control unit 2 has a function of receiving the current amounts transmitted from the return current detection units 1a and 1b, determining whether each current amount is normal or abnormal by comparing the current amount with preset threshold values T1 and T2, and displaying a determination result. In addition, the control unit 2 has a function of controlling measurement of entire mass analysis. In addition, as shown in FIG. 1, the control unit 2 may have a function of displaying the current amounts (current signals A and B) transmitted from the return current detection units 1a and 1b. The operator operates the mass spectrometer through the control unit 2. In signal diagrams showing the detection result of the ion amount and the current signals A and B shown in FIG. 1, a horizontal axis represents time, and a vertical axis represents the current amount. The control unit 2 includes, for example, a personal computer and a display.

The threshold values to be compared with the current amount transmitted from the return current detection units are set based on a current amount of a current flowing when the ion source 10 discharges electricity. For example, the ion source 10 is caused to discharge electricity in advance, and the current amount of a current flowing at a start of the electric discharge is stored in the control unit 2 as a threshold value. In addition, when it is desired to detect an abnormality before starting the electric discharge, a value slightly lower than the current amount at the start of the electric discharge may be stored as a threshold value. In addition, the threshold value T1 to be compared with the current amount transmitted from the return current detection unit 1a and the threshold value T2 to be compared with the current amount transmitted from the return current detection unit 1b may be different values.

Next, electrical discharge types of the ion source 10 and paths of the electric discharge current will be described with reference to FIG. 2.

FIG. 2 shows a connection diagram of an electric circuit that detects the electric discharge current in the ion source 10 constituting the mass spectrometer according to the present embodiment. At the time of a normal operation of the mass spectrometer, the electric discharge does not occur in the ion source 10. However, abnormal electric discharge may occur in the mass spectrometer due to accumulation of impurities in the mass spectrometer and the like. In FIG. 2, a path through which a current generated by abnormal electric discharge flows is indicated by a broken line.

There are two types of the electric discharge generated in the ion source 10 including electric discharge 2b from the needle 3 to the counter electrode 19 and electric discharge 2a from the needle 3 to a part other than the counter electrode 19 that electrically conducts with the frame 1. A current (electric discharge current) 3b of the abnormal electric discharge flowing due to the electric discharge 2b passes through the return current detection unit 1b via the counter electrode 19 and the counter electrode power supply 21 in this order, further passes through the return current detection unit 1a, and then returns to the ion source power supply 20 which is a current output source. A current (electric discharge current) 3a of the abnormal electric discharge flowing due to the electric discharge 2a passes through the return current detection unit 1a via the frame 1, and then returns to the ion source power supply 20 which is a current output source.

Therefore, the return current detection unit 1a detects both the current 3a of the electric discharge 2a and the current 3b of the electric discharge 2b, and the return current detection unit 1b detects only the current 3b of the electric discharge 2b. Therefore, first, the return current detection unit 1a can detect presence or absence of the abnormal electric discharge of the ion source 10. In addition, based on a measurement result of the return current detection unit 1b, it is possible to determine which path of the path of the current 3a and the path of the current 3b the currents flowing due to the abnormal electric discharge flow through. That is, it is possible to detect the presence or absence of the electric discharge of the ion source 10 and to identify the portion where the electric discharge occurs.

At this time, when an absolute value of the current amount measured by the return current detection unit 1a is equal to or greater than the threshold value T1 (see FIG. 1) and an absolute value of the current amount measured by the return current detection unit 1b is less than the threshold value T2 (see FIG. 1), the control unit 2 determines that the electric discharge 2a occurs. In addition, when the absolute value of the current amount measured by the return current detection unit 1a is equal to or greater than the threshold value T1 and the absolute value of the current amount measured by the return current detection unit 1b is equal to or greater than the threshold value T2, the control unit 2 determines that the electric discharge 2b occurs. In this way, the control unit determines, based on the current amounts measured by each of the return current detection units 1a and 1b, presence or absence of the electric discharge 2a between the needle 3 and components of the ion source other than the counter electrode 19 and presence or absence of the electric discharge 2b between the needle 3 and the counter electrode 19.

FIG. 1 shows the current signal A indicating the current amount transmitted by the return current detection unit 1a, the current signal B indicating the current amount transmitted by the return current detection unit 1b, and the detection result of the ion amount transmitted by the ion detector 7. The three waveforms are divided into a normal waveform region 1N in which no abnormal electric discharge occurs in the ion source 10, an electric discharge waveform region 2X in which the electric discharge 2b occurs, and an electric discharge waveform region 1X in which the electric discharge 2a occurs.

An operator of the device monitors only the detection result of the ion amount during the measurement, and can acquire a result of a normal ion amount in a normal state in which the abnormal electric discharge does not occur in the ion source 10. When the electric discharge occurs in the ion source 10 and the current amount of the return current detection unit 1a exceeds the threshold value T1, the control unit 2 notifies the operator of the occurrence of the abnormal electric discharge as an error or warning by displaying, lighting, sound, or the like, and also displays a portion where the electric discharge occurs based on magnitude relation between the current amount of the return current detection unit 1b and the threshold value T2. For example, when a current in, for example, the waveform region 1X is detected, it can be determined that the portion where the electric discharge occurs is at the path of the electric discharge 2a between the needle 3 and the frame 1. In addition, when a current in, for example, the waveform region 2X is detected, it can be determined that a portion where the electric discharge occurs is at the path of the electric discharge 2b between the needle 3 and the counter electrode 19.

Based on the displayed information, the operator of the device can take measures to interrupt the measurement and remove a cause of the electric discharge such as cleaning of the portion (ion source 10) where the electric discharge occurs. The cause is identified in the above manner. The interruption (stop of the mass analysis processing) of the measurement may be executed by an operation of the operator of the device, or may be automatically executed by the control unit 2 at a time point when an abnormal current in, for example, the waveform region 1X or 2X is detected.

FIG. 12 shows an operation flow of the mass spectrometer according to the present embodiment. The operation flow is an example in which a procedure of detecting the electric discharge according to the present embodiment described above is incorporated into a general operation flow of mass analysis.

First, in a device activation processing in step S1, an operation of the mass spectrometer is set based on start information of the mass analysis input by the operator via the control unit 2. The start information includes, for example, an operation mode of the mass analysis, voltages of various power supplies to be mounted, and a measurement end condition (for example, measurement time).

Waiting for a measurement start in step S2 is processing executed at the time of waiting until a measurement start instruction is input by the operator via the control unit 2. The processing is, for example, periodic reading of information on a device state.

Step S3 is determining inputting of the measurement start instruction, and when the measurement start instruction is input by the operator via the control unit 2, the procedure proceeds to step S4. In a state in which the measurement start instruction is not input, the procedure proceeds to step S2.

In acquiring ion amount data in step S4, processing of taking detection data of the ion amount transmitted from the ion detector 7 into the control unit 2 is executed.

In mass analysis processing in step S5, the ion amount data acquired in step S4 is calculated and processed based on information such as the operation mode set in step S1. The operation mode is, for example, a scan mode or a selected ion monitoring (SIM) mode of the mass analysis.

Displaying mass analysis result in step S6 is processing of displaying the calculation processing result in step S5 on a screen or the like of the control unit 2. The result to be displayed is, for example, a mass spectrum or a chromatogram.

Reading the device state in step S7 is processing of reading device state information by which whether the state of the mass spectrometer is normal or abnormal can be determined based on various sensors, detectors, and the like mounted on the mass spectrometer. Here, the current amounts obtained by the return current detection units according to the present embodiment are transmitted to the control unit 2. In addition, other device state information is, for example, error or warning information of various power supplies or a vacuum pump unit, or temperature information of a heater.

Step S8 is determining an error or warning of the device state information, and when there is an error or a warning in the device state information read in step S7, the procedure proceeds to step S9. When there is no error or warning, the procedure proceeds to step S12.

Step S9 is determining the presence or absence of the electric discharge, and the procedure proceeds to step S10 when the control unit 2 determines that the electric discharge occurs based on a result of comparing the threshold values with the absolute values of the current amounts transmitted from the return current detection units according to the present embodiment. The current amounts are included in the device state information read in step S7. When the control unit 2 determines that the electric discharge does not occur, the procedure proceeds to step S11.

Electric discharge responding processing in step S10 is processing performed when the electric discharge occurs in the ion source 10. For example, the warning of the occurrence of the electric discharge is notified by the control unit 2 to the operator, condition information of an end of the measurement is set to a true value to promptly stop the measurement operation of the mass spectrometer, or an electric discharge portion is determined based on the current amount transmitted by the return current detection unit 1b and notified to the operator.

Other abnormality processing in step S11 is processing for an abnormal state other than the electric discharge. For example, the other abnormality processing is a warning notification corresponding to an operation error of the various power supplies or a vacuum pump, a true value setting for a measurement end condition, or the like.

Step S12 is determining an end of the measurement operation, and the measurement operation of the mass spectrometer is ended when a measurement end instruction of the operator is input, when measurement time is ended, when the measurement end condition is set to the true value in step S10 or S11, or the like.

FIG. 13 is a schematic diagram showing an example of a user interface screen of the mass spectrometer according to the present embodiment. A user interface screen 100 is displayed on the display of the control unit 2, and includes an operation region 110 and a display region 111.

The operation region 110 includes a device activation button 101 for activating the device and a setting button 102 for inputting the start information of the mass analysis. The operator executes step S1 by the device activation button 101 and the setting button 102. In addition, the operation region 110 includes a measurement start button 103 and a measurement end button 104. The operator executes step S3 by the measurement start button 103 and executes step S12 by the measurement end button 104.

The display region 111 includes a measurement result region 105 and a device state display region 106, and the measurement result region 105 displays the detection result of the ion amount which is the execution result in step S6, and the device state display region 106 displays the execution result in step S7.

The device state display region 106 includes a device state result 107 that displays a total result of monitoring a device state. Display content of the device state result 107 indicates, for example, abnormality if there is at least one error or warning and normality if there is no error or warning in the device state read result obtained in step S7.

The device state display region 106 includes a detailed state result 109. The detailed state result 109 individually displays, for example, the device state read result obtained in step S7. The result to be displayed is, for example, the presence or absence of abnormality of electric discharge, temperature, a vacuum degree, and the like in the ion source 10. The detailed state result 109 may be displayed on a separate screen according to an instruction of the operator without being usually displayed on the user interface screen 100 such that the operator can execute checking as necessary. When the control unit 2 detects the occurrence of the electric discharge 2*a* or 2*b* (see FIG. 1), the control unit 2 displays the portion where the electric discharge occurs on the device state display region 106.

<Effects According to Present Embodiment>

Here, in order to describe effects according to the present embodiment, a mass spectrometer according to a comparative example is shown in FIG. 15. A structure of the mass spectrometer according to the comparative example shown in FIG. 15 is different from that of the mass spectrometer shown in FIG. 1 in that an ammeter is not provided between the frame 1 and the second terminal of each of the ion source power supply 20 and the counter electrode power supply 21, and that each of the ion source power supply 20 and the counter electrode power supply 21 does not have a third terminal. Since the above ammeter is not provided, a current amount of an abnormal current is not transmitted to the control unit 2.

It is considered that impurities (dust) are accumulated inside the mass spectrometer by continuing using the mass spectrometer. A normal mass spectrometer in which the impurities are not accumulated inside has withstand voltage performance such that electric discharge does not occur in an ion source. However, when the accumulation of the impurities progresses, the electric discharge occurs, and for example, the electric discharge occurs between a needle and a frame or between the needle and a counter electrode. When such electric discharge occurs, ionization efficiency of a sample, which is an original role of the needle, decreases, and it becomes difficult to execute mass analysis normally.

During the measurement, an operator of the mass spectrometer according to the comparative example monitors only a detection result of an ion amount, and when abnormal electric discharge occurs, it is considered that an abnormality such as a decrease in the ion amount, which is the detection result, is confirmed. In this case, the operator interrupts the measurement and removes a cause of the electric discharge. However, since an electric discharge portion cannot be identified immediately, there is a problem that it takes time to inspect each portion in the mass spectrometer.

As one of causes of the abnormality of the decrease in the ion amount, which is the monitored detection result, electric discharge in the mass spectrometer is considered, and other causes other than the electric discharge, such as clogging occurring in a tube between a pretreatment unit and a needle, are also considered. In the mass spectrometer according to the comparative example, since presence or absence of the abnormality is determined by monitoring only the detection result of the ion amount, it is not possible to determine whether the cause of the abnormality is electric discharge or other factors such as clogging in a tube. Therefore, there is a problem that it takes time to inspect whether the cause of the abnormality is a cause other than the electric discharge.

When a measurement abnormality due to electric discharge occurs, the operator may not notice the abnormality and may acquire measurement data of an invalid ion amount.

Since it takes time from a time point when the abnormal electric discharge occurs to a time point when the abnormality is recognized and the measurement is interrupted, there is a problem that a sample is wasted during this period. For example, when the sample is human blood or the like, an amount of the sample prepared in advance is not large, and in such a case, in particular, it is required to reduce the waste of the sample as much as possible.

On the other hand, in the present embodiment, as shown in FIG. 1, the return current detection unit 1*a* that detects the current 3*a* flowing via the frame 1 due to the abnormal electric discharge and the current detection unit 1*b* that detects the current 3*b* flowing via the frame 1 due to the abnormal electric discharge are provided. Accordingly, it is possible to instantaneously detect the occurrence of the abnormal electric discharge. In addition, since the return current detection units 1*a* and 1*b* are respectively provided in the ion source power supply 20 and the counter electrode power supply 21, a portion where the electric discharge occurs can be identified in the ion source 10. In addition, since it is obvious that the cause of the abnormality in the detection result of the ion amount is not the clogging of the tube or the like but the electric discharge, it is possible to omit a step of inspecting whether the cause of the abnormality is a cause other than the electric discharge. Accordingly, since a step of inspecting each of portions inside and outside the mass spectrometer to identify the portion where the electric discharge occurs can be omitted, mass analysis using the mass spectrometer can be executed in a short time and at a low cost. Therefore, performance of the mass spectrometer can be improved.

Since the measurement can be immediately interrupted by the control unit 2 or the operator, the waste of the sample can be reduced. In particular, if the measurement is stopped by the control unit 2, the waste of the sample can be minimized. Therefore, the performance of the mass spectrometer can be improved.

As described above, since the occurrence of the measurement abnormality due to the electric discharge can be instantaneously recognized, the measurement can be interrupted in a short time to reduce the waste of the sample. In addition, the measurement data at this time is deleted as invalid data in which an abnormality occurs, and soundness of an analysis result can be secured. In addition, since the electric discharge portion is also found in a short time, a maintenance property can be improved.

The mass spectrometer according to the present embodiment can be implemented by simply providing an ammeter between the power supply and the frame of the mass spectrometer according to the comparative example shown in FIG. 15, and the above effects can be attained by monitoring a current amount measured by the ammeter.

Second Embodiment

In measurement performed by a mass spectrometer, polarities of voltages applied to a needle and a counter electrode of an ion source are different depending on a type of an analysis target or an analysis method. A positive voltage is applied to the needle and the counter electrode when a sample to be analyzed is positively ionized, and a negative voltage is applied to the needle and the counter electrode when the sample is negatively ionized. Hereinafter, a method for setting a threshold value for determining presence or absence of electric discharge according to the polarities of the voltages applied to the needle and the counter electrode in the mass spectrometer described in the first embodiment will be described.

FIG. 3 shows a graph showing properties of an electric discharge voltage and a current of the mass spectrometer according to the present embodiment. In the graph, a horizontal axis represents the voltage applied to the needle of the ion source, and a vertical axis represents a current amount detected by a return current detection unit mounted on an ion source power supply. When the voltage applied to the needle is increased from 0 V toward a positive polarity direction, the return current amount also increases, and when the voltage applied to the needle reaches X1, the return current amount steeply increases. At this time, the voltage X1 applied to the needle is a voltage at which electric discharge starts in a positive polarity, and a return current amount Y1 is a current at which the electric discharge starts in the positive polarity. On the other hand, when the voltage applied to the needle is decreased from 0 V toward a negative polarity direction, regarding a return current, the return current increases toward the negative polarity direction, and when the voltage applied to the needle reaches X2, the return current amount steeply increases toward the negative polarity direction. At this time, the voltage X2 applied to the needle is a voltage at which electric discharge starts in a negative polarity, and a return current amount Y2 is a current at which the electric discharge starts in the negative polarity.

Here, the positive needle application voltage X1 of the positive polarity and the negative needle application voltage X2 are different from each other, and the positive return current amount Y1 and the negative return current amount Y2 are different from each other. Therefore, it is noted that when the presence or absence of the electric discharge is to be determined by setting one threshold value for the return current amount, the electric discharge cannot be detected in the following case.

Here, as a comparative example, a case will be described in which, at the time of positive ion measurement and negative ion measurement of the threshold value for determining the presence or absence of the electric discharge of the ion source, the same threshold value is used. For example, in a case in which the positive return current amount Y1 is set as the threshold value, when the negative return current amount Y2 is lower than the positive return current amount Y1, the current amount of the return current detection unit is lower than the threshold value and the electric discharge cannot be detected even if the negative ionization is performed, the measurement is performed, and the electric discharge occurs. Therefore, it is required to set different values for the threshold value for determining the presence or absence of the electric discharge of the ion source when the sample to be analyzed is positively ionized and measured and the threshold value when negative ions are measured.

Absolute values of the positive needle application voltage X1 and the negative needle application voltage X2 are different from each other, and absolute values of the positive return current amount Y1 and the negative return current amount Y2 are different from each other. Therefore, when the determination is made based on only one absolute value of the return current amount, it may not be possible to detect the electric discharge.

FIGS. 4 and 5 show signal diagrams showing setting of the threshold values for determining the abnormal electric discharge in the miss spectrometer according to the present embodiment. FIG. 4 is a signal diagram when a positive voltage is applied to the needle and the counter electrode. FIG. 5 is a signal diagram when a negative voltage is applied to the needle and the counter electrode. In the signal diagrams in FIGS. 4 and 5 respectively showing the current signals A and B, a horizontal axis represents time, and a vertical axis represents the current amount.

In FIGS. 4 and 5, a positive threshold value 30 and a negative threshold value 31 for comparison with the current amount of the return current detection unit 1a of the ion source power supply are described as the threshold values for determining the presence or absence of the electric discharge. In addition, in FIGS. 4 and 5, a positive threshold value 40 and a negative threshold value 41 for comparison with the current amount of the return current detection unit 1b of the counter electrode power supply are shown as the threshold values for determining the presence or absence of the electric discharge. Here, absolute values of the threshold value 30 and the threshold value 31 are set to values different from each other, and absolute values of the threshold value 40 and the threshold value 41 are set to values different from each other.

<Effects According to Present Embodiment>

The threshold values 30 and 40 are used as the threshold values when the sample is positively ionized and measured as shown in FIG. 4 and the threshold values 31 and 41 are used as the threshold values when the sample is negatively ionized and measured as shown in FIG. 5. Accordingly, even though electric discharge currents are different at the positive and negative polarities, it is possible to normally determine the presence or absence of the occurrence of the electric discharge.

Third Embodiment

In a mass spectrometer, there is a method (hereinafter, referred to as positive and negative switching measurement) of switching the measurement performed by the positive ionization and the measurement performed by the negative ionization in a short time and performing the measurement to shorten an analysis time. Hereinafter, a method for determining the presence or absence of the electric discharge of the ion source in the mass spectrometer described in the second embodiment will be described with reference to FIGS. 6 and 7.

The positive and negative switching measurement (positive and negative ion switching measurement) is executed by switching the polarities of the voltages applied to the needle and the counter electrode of the ion source in a short time. The switching time in this case is, for example, several ms to several tens of ms. Here, stray capacitances are physically generated between the needle and the frame of the device and between the counter electrode and the frame of the device, and the ion source power supply and the counter electrode power supply charge the stray capacitances when voltages are applied to the needle and the counter electrode.

FIG. 6 shows a signal diagram showing a return current waveform of the ion source power supply at the time of the positive and negative ion switching measurement. In FIG. 6, a horizontal axis represents time and a vertical axis represents a return current amount, and the time axis is divided into a region of measurement (positive) representing the measurement performed by the positive ionization and a region of measurement (negative) representing the measurement performed by the negative ionization. In addition, the positive threshold value 30 and the negative threshold value 31 are also shown. Here, solid line portions of the threshold values 30 and 31 are regions in which the thresholds are valid. For example, in the threshold value 30, the region of the measurement (positive) representing the measurement performed by the positive ionization is indicated by a solid line, and the region of the measurement (negative) is indicated by a broken line, thereby clearly indicating that the threshold value 30 is valid in the region of the measurement (positive). On the contrary, the threshold value 31 is indicated by a solid line in the region of the measurement (negative), and is indicated by a broken line in the region of the measurement (positive). In FIG. 6, signal waveforms when electric discharge 51 occurs are indicated by one-dot chain lines.

In FIG. 6, when the measurement (negative) is switched to the measurement (positive), the return current amount is increased by an inrush current 50 for charging the stray capacitances described above. At this time, the return current amount exceeds the threshold value 30. Similarly, when the measurement (positive) is switched to the measurement (negative), the return current amount also exceeds the threshold value 31 by the inrush current 50. That is, in the positive and negative switching measurement, the inrush current 50 cannot be distinguished from an electric discharge current, and the inrush current at the time of a switching operation is erroneously detected as electric discharge.

As a countermeasure, FIG. 7 shows, by a signal diagram, a method for masking the inrush current at the time of the positive and negative switching measurement in the mass spectrometer according to the present embodiment. In FIG. 7, the signal waveforms when the electric discharge 51 occurs are indicated by the one-dot chain lines. Switching between the measurement performed by the positive ionization and the measurement performed by the negative ionization is controlled by the control unit 2 (see FIG. 1) of the mass spectrometer. Since the control unit 2 recognizes a timing at which the inrush current is generated, it is possible to provide a dead time 53 during which threshold determination is not performed such that the electric discharge is not detected at a switching timing. A period of the dead time 53 is set in the control unit 2 by measuring a time until the inrush current is stabilized in advance. In the signal diagram in FIG. 7, a time zone of the dead time 53 is hatched.

That is, here, a certain period of time from a time point immediately before the generation of the inrush current to a time point when the inrush current is stabilized and a period of time (dead time 53) during which the threshold determination is not executed are provided. The certain period of time is at least a period of time from a time point before the generation of the inrush current, that is, a timing immediately before switching between the measurement performed by the positive ionization and the measurement performed by the negative ionization, to a time point when absolute values of the current amounts become smaller than the threshold values.

<Effects according to Present Embodiment>

As described above, in the positive and negative switching measurement, at the time of switching between the measurement performed by the positive ionization and the measurement performed by the negative ionization, it is possible to prevent the erroneous detection of the electric discharge by masking the inrush current by providing the dead time during which the electric discharge is not detected.

Fourth Embodiment

In the third embodiment, in order to avoid erroneously detecting, as the electric discharge current, the inrush current generated when the switching is performed between the measurement performed by the positive ionization and the measurement performed by the negative ionization in a short time and the measurement is performed, the dead time is provided during which the electric discharge detection is not performed at the timing at which the inrush current is generated. Hereinafter, it will be described with reference to FIGS. 8 to 11 that the dead time is required only for a current amount transmitted by a return current detection unit of an ion source power supply and is not required for a current amount transmitted by a return current detection unit of a counter electrode power supply.

FIG. 8 shows a connection diagram showing a path of an inrush current of each of the ion source power supply and the counter electrode power supply that constitute a mass spectrometer according to the present embodiment. Here, as an example, an operation of changing voltages of the needle 3 and the counter electrode 19 from a negative polarity to a positive polarity to switch the measurement performed by the negative ionization to the measurement performed by the positive ionization will be described.

First, the inrush current path of the ion source power supply will be described. When a voltage is applied to the needle 3, the ion source power supply 20 charges a stray capacitance 7a between the needle 3 and the frame 1. An inrush current 8a generated at the time of the charge is output from the ion source power supply 20, and passes through the return current detection unit 1a via the needle 3, the stray capacitance 7a, and the frame 1 and returns to the ion source power supply 20. That is, the inrush current. 8a passes through the same path as that of the current 3a (see FIG. 2).

Next, the inrush current path of the counter electrode power supply will be described. When a voltage is applied to the counter electrode 19, the counter electrode power supply 21 charges a stray capacitance 7b between the counter electrode 19 and the frame 1. The inrush current 8b generated at the time of the charging is output from the counter electrode power supply 21, and passes through the counter electrode 19, the stray capacitance 7b, the frame 1, and the return current detection unit 1b in this order and returns to the counter electrode power supply 21. That is, the inrush current 8b passes through the return current detection unit 1b in a direction opposite to that of the current 3b (see FIG. 2).

The directions of the paths of the inrush current 8b and the current 3b will be described in more detail with reference to FIG. 9. FIG. 9 is a connection diagram showing a path of each of an electric discharge current and the inrush current of the counter electrode power supply constituting the mass spectrometer according to the present embodiment. In FIG. 9, the path of the current 3b is indicated by a solid line, and the path of the inrush current 8b is indicated by a broken line.

The current 3b generated by the electric discharge 2b is superimposed on the counter electrode 19, and is suctioned into a first terminal (output terminal) of the counter electrode power supply 21. At this time, the counter electrode power supply 21 performs an operation of absorbing the current while outputting a positive voltage. The current 3b suctioned into the counter electrode power supply 21 passes through the return current detection unit 1b, and then returns to the ion source power supply 20 (see FIG. 2), which is a current supply source of the electric discharge 2b, via the frame 1. On the other hand, since the counter electrode power supply 21 positively charges the counter electrode 19, the flow direction of the inrush current 8b is a direction along which the inrush current 8b is discharged from the first terminal (output terminal) of the counter electrode power supply 21.

As described above, the inrush current 8b and the current 3b pass through the return current detection unit 1b in opposite directions.

The above description is a description of the operation of changing the voltages of the needle 3 and the counter electrode 19 from the negative polarity to the positive polarity to switch from the measurement performed by the negative ionization to the measurement performed by the positive ionization. On the other hand, regarding the operation of changing the polarities of the voltages to be switched from the positive polarity to the negative polarity, the directions of the inrush current 8b and the current 3b passing through the return current detection unit 1b are similarly opposite to each other only by setting directions along which the currents flow to be opposite.

FIG. 10 shows, by a signal diagram, a return current waveform of the ion source power supply according to the present embodiment, and FIG. 11 shows, by a signal diagram, a return current waveform of the counter electrode power supply according to the present embodiment. The waveforms shown in FIGS. 10 and 11 are waveforms when the voltages of the needle 3 and the counter electrode 19 are changed from the negative polarity to the positive polarity to switch from the measurement performed by the negative ionization to the measurement performed by the positive ionization. In FIGS. 10 and 11, the signal waveforms when the electric discharge 51 occurs are indicated by one-dot chain lines.

As shown in FIG. 10, in the return current waveform of the ion source power supply, the inrush current 50 is generated at a timing of switching from the measurement (negative) to the measurement (positive). In order to prevent the inrush current 50 from being erroneously detected as the electric discharge 51, the dead time 53 is provided as described in the third embodiment. On the other hand, as shown in FIG. 11, in the return current waveform of the counter electrode power supply, the inrush current 54 is also generated at the timing of switching from the measurement (negative) to the measurement (positive). However, a flow direction of the inrush current 54 is opposite to the flow direction of each of the inrush current 50 and the electric discharge 51. Therefore, even if the dead time is not provided, the inrush current 54 is not erroneously detected as the electric discharge at the threshold value 30 at the time of switching to the measurement performed by the positive ionization.

That is, in the control unit, the dead time 53 is set during which the electric discharge is not detected based on the current amount measured by the return current detection unit 1a when the polarity of the voltage applied from the ion source power supply to the needle is switched. On the other hand, the dead time 53 during which the electric discharge is not detected based on the current amount measured by the return current detection unit 1b when the polarity of the voltage applied from the counter electrode power supply to the counter electrode is switched is not set in the control unit. In other words, here, when the polarity of the voltage applied to the needle from the ion source power supply is switched, the electric discharge is not detected based on the current amount measured by the return current detection unit 1a for a certain period of time from a time point immediately before the switching to a time point after the switching. On the other hand, when the polarity of the voltage applied from the counter electrode power supply to the counter electrode is switched, the electric discharge is continuously detected based on the current amount measured by the return current detection unit 1b before and after the switching operation.

<Effects of Present Embodiment>

In the positive and negative switching measurement, in order to prevent the inrush current generated at the time of switching between the measurement performed by the positive ionization and the measurement performed by the negative ionization from being erroneously detected as the electric discharge, a dead time in which the electric discharge is not detected may be provided only for the current amount that is transmitted by the return current detection unit mounted on the ion source power supply. Accordingly, the period of the dead time is required to be measured in advance only in the ion source power supply, and is not required in the counter electrode power supply. That is, since it is not required to set the dead time regarding the measurement performed by the counter electrode power supply, it is possible to shorten a start-up adjustment time for detecting the electric discharge.

Fifth Embodiment

In the first to fourth embodiments, the unit that detects the electric discharge in the ion source is described. Hereinafter, a description will be made for a mass spectrometer mounted with a focusing unit power supply, a separating unit power supply, and a detector power supply each including a return current detection unit, and a method for determining presence or absence of electric discharge in a focusing unit, a separating unit, and a detector based on a current amount detected by the return current detection unit when a sample to be analyzed is measured and a detection result of an ion amount measured by the mass spectrometer.

FIG. 14 shows a schematic diagram of the mass spectrometer according to the present embodiment for describing a unit that detects an electric discharge current other than the ion source. The mass spectrometer according to the present embodiment includes a focusing unit power supply 22, a separating unit power supply 23, and a detector power supply 24. The focusing unit power supply 22 is a power supply that applies a voltage to the electrode 9a provided in the focusing unit 11. The separating unit power supply 23 is a power supply that applies a voltage to the electrode 9b provided in the separating unit 12. The detector power supply 24 is a power supply that applies a voltage to the conversion dynode (electrode) 9c provided in the detector 13.

The focusing unit power supply 22, the separating unit power supply 23, and the detector power supply 24 respectively include return current detection units (ammeters) 1c, 1d, and 1e that can detect an output current from a return current returned via the frame 1. That is, the focusing unit power supply 22 and the frame 1 are electrically connected via the return current detection unit 1c, the separating unit power supply 23 and the frame 1 are electrically connected via the return current detection unit 1d, and the detector power supply 24 and the frame 1 are electrically connected via the return current detection unit 1e.

Similarly to the counter electrode power supply 21 according to the first embodiment, each of the focusing unit power supply 22, the separating unit power supply 23, and the detector power comply 24 includes a first terminal, a second terminal, and a third terminal. The first terminal (output terminal) of the focusing unit power supply 22 is electrically connected to the electrode 9a. The second terminal (ground) of the focusing unit power supply 22 is electrically connected to the frame 1. The third terminal of the focusing unit power supply 22 is electrically connected to the control unit 2. The first terminal (output terminal) of the separating unit power supply 23 is electrically connected to the electrode 9b. The second terminal (ground) of the separating unit power supply 23 is electrically connected to the frame 1. The third terminal of the separating unit power supply 23 is electrically connected to the control unit 2. The first terminal (output terminal) of the detector power supply 24 is electrically connected to the conversion dynode 9c. The second terminal (ground) of the detector power supply 24 is electrically connected to the frame 1. The third terminal of the detector power supply 24 is electrically connected to the control unit 2.

However, in each of the focusing unit power supply 22, the separating unit power supply 23, and the detector power supply 24, the third terminal is electrically insulated from the first terminal and the second terminal. That is, a unit that transmits current amounts detected by the return current detection units (ammeters) 1c, 1d, and 1e is electrically insulated from the control unit 2 that is a transmission target. In other words, the return current detection units 1c, 1d, and 1e, the focusing unit power supply 22, the separating unit power supply 23, and the detector power supply 24 are insulated from the control unit 2.

Although not shown in FIG. 1, the focusing unit power supply 22, the separating unit power supply 23, and the detector power supply 24 are also provided in the mass spectrometer according to the first embodiment. That is, the mass spectrometer according to the present embodiment is different from the mass spectrometer according to the first embodiment in that the focusing unit power supply 22, the separating unit power supply 23, and the detector power supply 24 respectively include the return current detection units 1c, 1d, and 1e.

The control unit 2 has a function of displaying a detection result of an ion amount transmitted from the ion detector 7 to an operator. In addition, the control unit 2 has a function of receiving the current amounts transmitted from the return current detection units 1c, 1d, and 1e, determining whether the current amounts are normal or abnormal by comparing the current amounts with a threshold value, and displaying a determination result. In addition, the control unit 2 has a function of controlling measurement of entire mass analysis. The operator operates the mass spectrometer through the control unit 2. While the current amount transmitted from the return current detection units 1c, 1d, and 1e may be compared with the threshold value to determine whether the current amount is normal or abnormal as described above, the current amounts transmitted from the return current detection units 1a and 1b may be compared with the threshold value to determine the presence or absence of the electric discharge in the ion source 10.

<Effects According to Present Embodiment>

Since measurement abnormality due to the electric discharge of the focusing unit, the separating unit, and the detector of the mass spectrometer can be instantaneously known, the measurement can be interrupted in a short time, and the waste of the sample can be reduced. In addition, measurement data at this time is deleted as invalid data in which an abnormality occurs, and soundness of an analysis result can be secured. In addition, since the electric discharge portion is also found in a short time, a maintenance property can be improved.

While the invention made by the present inventors has been specifically described based on the embodiments of the invention, the invention is not limited to the embodiments described above, and various modifications may be made without departing from the scope of the invention.

INDUSTRIAL APPLICABILITY

The invention can be widely used in a mass spectrometer and a mass spectrometry method.

REFERENCE SIGNS LIST 1 frame
1a to 1e return current detection unit (ammeter)
2 control unit
3 needle
4 pretreatment unit
6 ion electric conversion unit
7 ion detector
9c conversion dynode
11 focusing unit
12 separating unit
13 detector
19 counter electrode
20 ion source power supply
21 counter electrode power supply

The invention claimed is:

1. A mass spectrometer for analyzing a sample, the mass spectrometer comprising:
a frame which is a container having conductivity;
a needle provided in the frame;
an electrode provided apart from the needle in the frame;
a detector configured to detect an ion amount based on electrons that are emitted from an ionized sample generated based on the sample;
a controller configured to display a current amount measured by the detector;
a first power supply configured to apply a first voltage to the needle;
a second power supply configured to apply a second voltage to the electrode;
a first current detection unit connected in series between a ground of the first power supply and the frame; and
a second current detection unit connected in series between a ground of the second power supply and the frame, wherein
the controller respectively determines presence or absence of first electric discharge between the needle and a component of an ion source other than the electrode and presence or absence of second electric discharge between the needle and the electrode based on current amounts respectively measured by the first current detection unit and the second current detection unit.

2. The mass spectrometer according to claim 1, wherein when occurrence of the first electric discharge is detected, a portion where the first electric discharge occurs is displayed, and when occurrence of the second electric discharge is detected, a portion where the second electric discharge occurs is displayed.

3. The mass spectrometer according to claim 1, wherein the controller determines that the first electric discharge occurs when an absolute value of a first current amount measured by the first current detection unit is equal to or greater than a first threshold value and an absolute value of a second current amount measured by the second current detection unit is less than a second threshold value, and determines that the second electric discharge occurs when the absolute value of the first current amount is equal to or greater than the first threshold value and the absolute value of the second current amount is equal to or greater than the second threshold value.

4. The mass spectrometer according to claim 3, wherein the controller applies a third threshold value as the first threshold value and applies a fourth threshold value as the second threshold value when polarities of the first voltage and the second voltage are positive, and applies a fifth threshold value as the first threshold value and applies a sixth threshold value as the second threshold value when the polarities of the first voltage and the second voltage are negative.

5. The mass spectrometer according to claim 1, wherein the controller displays presence or absence of electric discharge detection on a user interface.

6. The mass spectrometer according to claim 5, wherein the controller displays a portion where the electric discharge occurs on the user interface when the first electric discharge or the second electric discharge is detected.

7. The mass spectrometer according to claim 1, wherein when positive and negative ion switching measurement is performed, a dead time during which electric discharge is not detected at a time of switching a power supply voltage is set in the controller.

8. The mass spectrometer according to claim 7, wherein the controller continuously detects the electric discharge based on a second current amount measured by the second current detection unit before and after an operation of switching a polarity of the second voltage.

9. The mass spectrometer according to claim 1, wherein the electrode is provided in an ion source, a focusing unit, a separating unit, or a detector.

10. A mass spectrometry method for analyzing a sample using a mass spectrometry, the mass spectrometry including
a frame which is a container having conductivity,
a needle provided in the frame,
an electrode provided apart from the needle in the frame,
a detector configured to detect an ion amount based on electrons that are emitted from an ionized sample generated based on the sample,
a controller configured to display a current amount measured by the detector,
a first power supply configured to apply a first voltage to the needle,
a second power supply configured to apply a second voltage to the electrode,
a first current detection unit connected in series between a ground of the first power supply and the frame, and
a second current detection unit connected in series between a ground of the second power supply and the frame,
the mass spectrometry method comprising: as steps executed by the controller,
(a) a step of starting mass analysis processing using the mass spectrometer; and
(b) a step of determining, after the step (a), presence or absence of first electric discharge between the needle and a component of an ion source other than the electrode and presence or absence of second electric discharge between the needle and the electrode based on a result of comparing absolute values of current amounts transmitted from the first current detection unit and the second current detection unit with a threshold value.

11. The mass spectrometry method according to claim 10 further comprising: as a step executed by the controller,
(c) a step of displaying, when occurrence of the first electric discharge or the second electric discharge is detected in the step (b), a portion where the first electric discharge or the second electric discharge occurs.

12. The mass spectrometry method according to claim 10, wherein
in the step (b), the controller determines that the first electric discharge occurs when an absolute value of a first current amount measured by the first current detection unit is equal to or greater than a first threshold value and an absolute value of a second current amount measured by the second current detection unit is less than a second threshold value, and determines that the second electric discharge occurs when the absolute value of the first current amount is equal to or greater than the first threshold value and the absolute value of the second current amount is equal to or greater than the second threshold value.

13. The mass spectrometry method according to claim 10 further comprising: as a step executed by the controller
(d) a step of stopping the mass analysis processing when the occurrence of the first electric discharge or the second electric discharge is detected in the step (b).

* * * * *